Sept. 1, 1964 G. K. MERDINIAN 3,147,451
RADIO FREQUENCY WATER LOAD COMPRISING TAPERED TUBULAR
BODY WITH INLET EXTENDING THROUGH SIDE WALL
Filed June 6, 1960 3 Sheets-Sheet 1
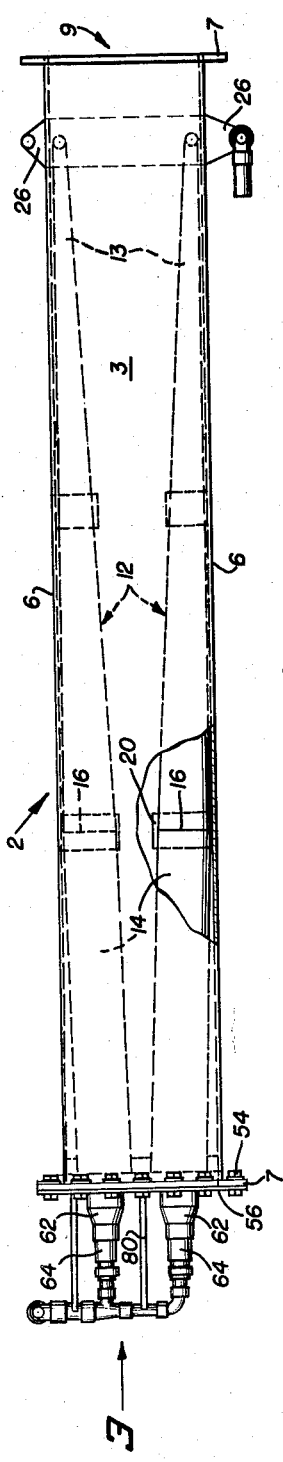
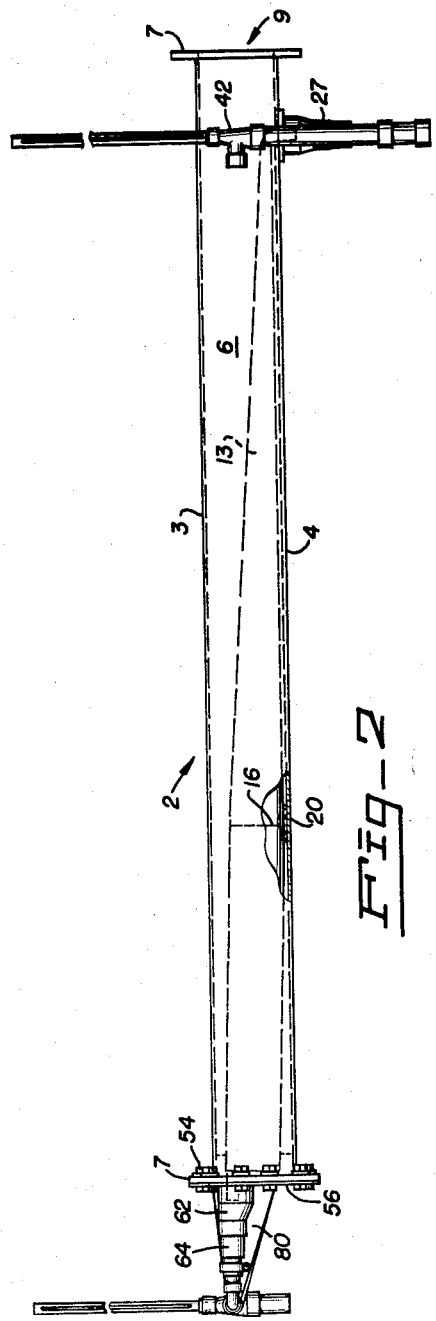
INVENTOR.
GEORGE K. MERDINIAN
BY
Leon F. Herbert
Robert W. Dilts
ATTORNEYS

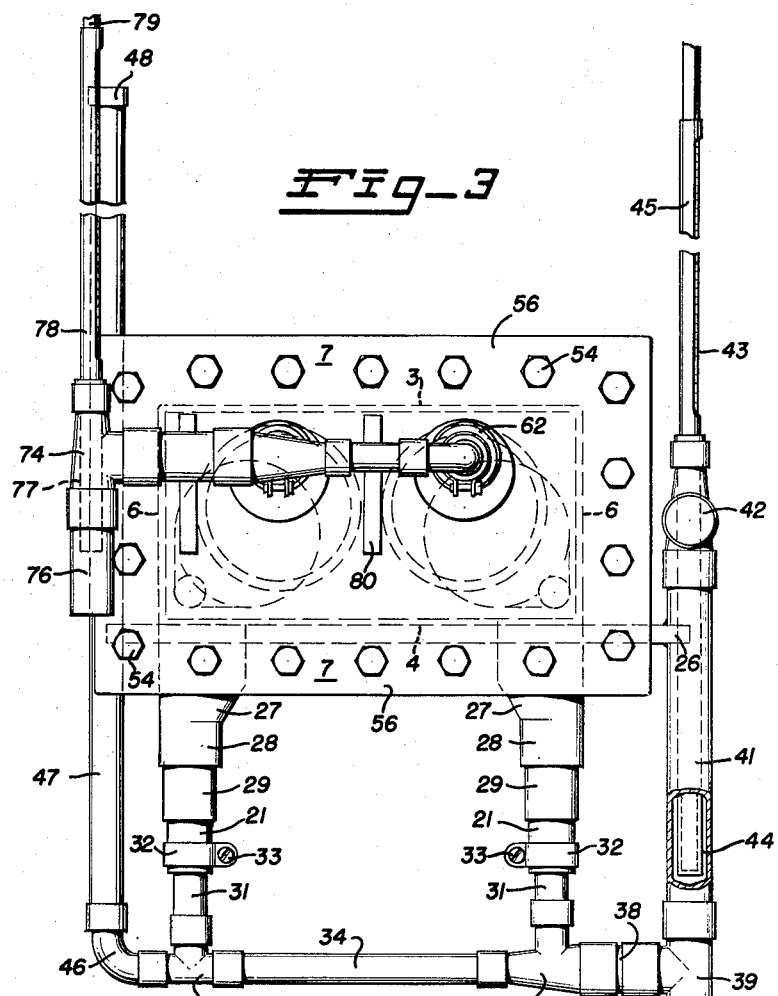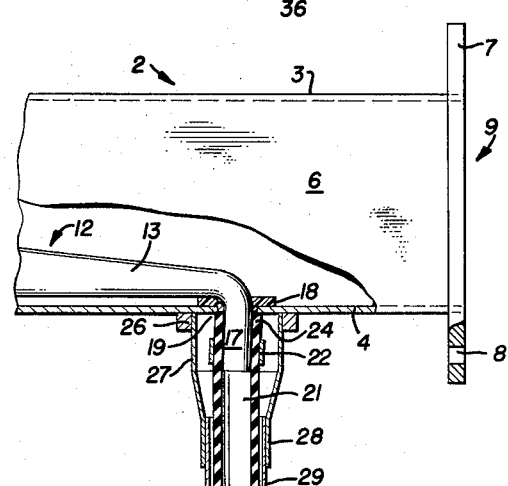

Sept. 1, 1964                G. K. MERDINIAN                3,147,451
      RADIO FREQUENCY WATER LOAD COMPRISING TAPERED TUBULAR
          BODY WITH INLET EXTENDING THROUGH SIDE WALL
Filed June 6, 1960                                3 Sheets-Sheet 3
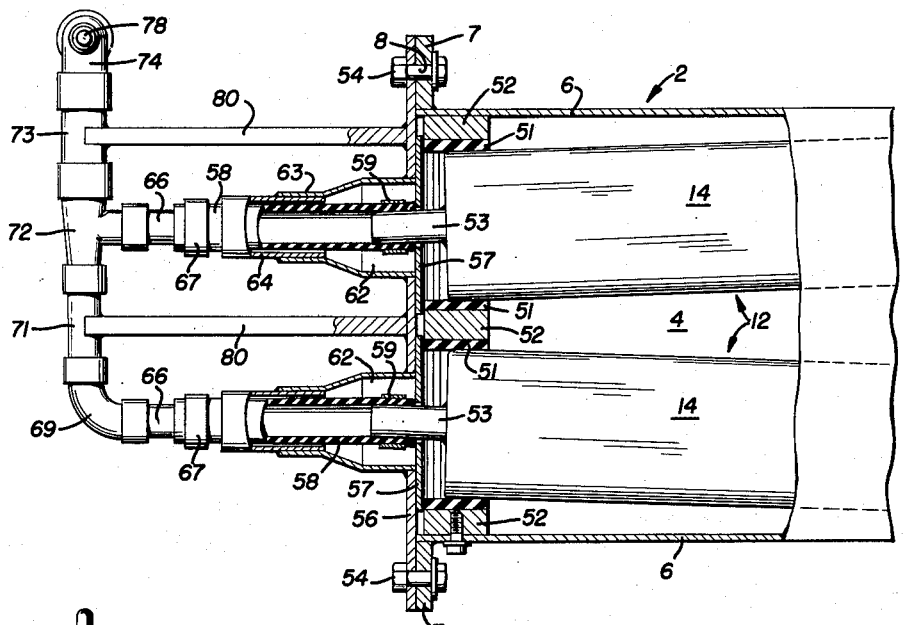
Fig_5
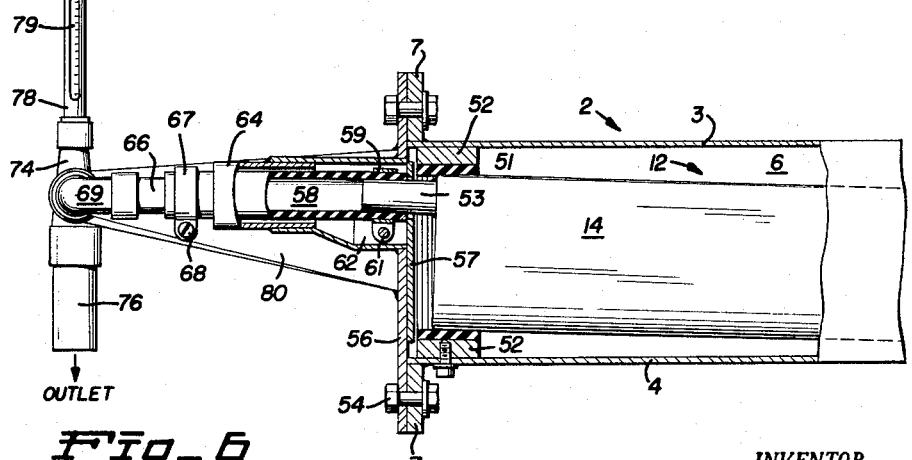
Fig_6
INVENTOR.
GEORGE K. MERDINIAN
BY
Leon F. Herbert
Robert W. Dilts
ATTORNEYS

3,147,451
RADIO FREQUENCY WATER LOAD COMPRISING TAPERED TUBULAR BODY WITH INLET EXTENDING THROUGH SIDE WALL

George K. Merdinian, Daly City, Calif., assignor to Eitel-McCullough, Inc., San Carlos, Calif., a corporation of California
Filed June 6, 1960, Ser. No. 34,247
4 Claims. (Cl. 333—22)

This invention relates to a radio frequency load, and more particularly, to a microwave waterload for the dissipation of electromagnetic energy.

In the electronics industry it has become necessary to develop devices to temporarily absorb the large amounts of power which are generated by electron tubes and apparatus of various types such as radar units, UHF television transmitters, magnetrons, and klystrons. Because of the high-power capabilities of these units it is necessary to provide "dummy loads" which permit generation of the required energy and tuning of apparatus while precluding detectable radiation of the energy. Thus, in a military radar installation, particularly under batttle conditions, it is necessary to tune the radar equipment to an optimum power output. The energy generated must be dissipated or absorbed in some manner without radiating it into the atmosphere and thus disclosing the location of the transmitter. For this purpose, waterloads have been found to be the most ideal "dummy loads" heretofore provided. When the microwave energy is exposed to the pointed or tapered end of a container filled with liquid, such as water, the energy is absorbed and converted into heat in the liquid.

Because a rapid rise in the temperature of water occurs, the container is lengthened by thermal expansion, the water also expands, thus increasing the internal pressure within the container and creating problems of sealing and circulation. It is therefore an important object of the invention to provide a waterload designed to accommodate such thermal expansion and contraction and increases in pressure without destructive strains.

Since the rise in temperature of the cooling liquid in the waterload is a function of the power output of the apparatus to which the waterload is connected, it is desirable to know the extent of the rise in temperature. It is accordingly another object of the present invention to provide a waterload incorporating means for determining the temperature differential between the cooling liquid at the input end of the waterload and at the output end of the waterload.

It has been determined that in the operation of a waterload, the sharper the tip of the tapered body of liquid and the longer the taper, the lower will be the VSWR, and the more efficiently will the load absorb radio frequency energy. It is therefore still another object of the invention to provide a waterload, including a waveguide portion, in which the taper is minimal at the input end of the waveguide or tip of the waterload, and gradually increases in diameter to a maximum dimension and substantially complete filling of the waveguide at the opposite end.

The waterload of the present invention is designed to operate in the L-band which comprises the frequency range between about 390 to 1550 megacycles. Waterloads designed to operate in this frequency band are normally required to be very long to provide the desired VSWR, and because of their length tend to be fragile. It is accordingly another object of the present invention to provide a waterload for operation in the L-band which provides tapered containers for the cooling liquid which are shorter than the containers of conventional waterloads and are adequately supported to eliminate normally destructive stresses imposed on the glass containers by vibration and impact shocks.

It is a still further object of the invention to provide a waterload which may be constructed using standard waveguide materials adapted to receive the tapered glass containers.

It is a still further object of the invention to provide a waterload in which the small end of the glass body containing the liquid lies closely adjacent the input end of the waterload, while the larger end of the tapered glass body lies closely adjacent the opposite end of the waveguide, so that radio frequency energy admitted at one end of the waveguide is wholly absorbed by the tapered glass body containing the absorbing liquid before the wave reaches the other end of the waveguide.

A still further object of the invention is the provision of a waterload which is capable of being disassembled and repaired.

The invention possesses other objects and features of advantage, some of which, with the foregoing, will be apparent from the following description and the drawings, wherein is disclosed one embodiment of the invention. It is to be understood that the invention is not limited to the particular embodiment described and chosen for illustration, as other embodiments may be adopted within the scope of the appended claims.

Briefly described, the waterload or radio frequency load comprises a standard waveguide adapted to be used in the frequency range desired. Extending longitudinally through the waveguide are a plurality of tapered glass containers, each having an extension projecting through an aperture in the waveguide and constituting the inlet end of the container. The inlet end of each tapered glass container constitutes the smallest dimension of the container and is positioned adjacent the radio frequency input end of the waveguide. The outlet of each tapered container within the waveguide is positioned adjacent the opposite end of the waveguide, and is suitably cushioned against vibration, shock and destructive contact with the waveguide wall, while being permitted to move longitudinally to accommodate thermal expansion and contraction. The outlet of the tapered glass container constitutes a glass tubulation reduced in cross-section to provide a connection for suitable couplings. The couplings for both the inlet and outlet ends of each tapered container are preferably flexible to accommodate and relieve any stress which may occur due to relative movement between the waveguide and the glass containers. The inlet ends of the tapered containers are preferably connected by a common manifold to provide flow of water through each of the containers simultaneously. Means are provided connecting with the manifold for the insertion of thermometer means for measuring the temperature of the water at the input end of the waterload. At the outlet end, water from the tapered containers within the waveguide empties into a common bypass or manifold provided with means for inserting a thermometer to measure the temperature of the water at the outlet end of the containers. Both the inlet and outlet water manifolds are rigidly supported on the waveguide, and are flexibly interconnected with the inlet and outlet tubulations by means of the couplings. As shown, both thermometers face in the same direction and are of equal height for facility in reading them.

Referring to the drawings:

FIGURE 1 is a plan view showing the waterload detached from the source of radio frequency energy. A portion of the waveguide is broken away to show the underlying structure.

FIGURE 2 is a side elevation of the waterload shown in FIGURE 1. A portion of the waveguide is broken away to show the internal structure.

FIGURE 3 is an end elevation of the waterload taken in the direction indicated by the arrow 3 in FIGURE 1. The view illustrates the rigid connection of the manifolds to the waveguide and the flexible interconnection of the inlet and outlet tubulations to the manifold.

FIGURE 4 is a fragmentary elevation partly in vertical section showing the inlet end of one of the tapered containers within the waveguide.

FIGURE 5 is a fragmentary view partly in horizontal section showing the means of rigidly supporting the large end of each of the containers within the waveguide against transverse movement while permitting a limited amount of longitudinal movement.

FIGURE 6 is a fragmentary side elevation view at the opposite end of the waveguide from FIGURE 4, portions of the waveguide being broken away to show the means of supporting the end of the tapered container against vertical movement.

In more specific detail, a radio frequency load according to the invention comprises a tubular body, conveniently a rectangular waveguide designated generally by the numeral 2, and including a top wall 3, a bottom wall 4, and side walls 6. The waveguide is preferably rectangular in cross section and hollow throughout its entire length. At each end the waveguide is provided with a peripheral mounting flange 7, the inner periphery of each of which is brazed about the outer peripheral portion of the waveguide. The mounting flanges are provided with suitable apertures 8, utilized at the input end 9 of the waterload to secure the waveguide to a source of radio frequency energy, such as a radar unit or a klystron. The waveguide is preferably of appropriate dimension for use with the desired frequency and may be purchased as a stock item from suppliers of transmission line materials. As with most transmission lines, the waveguide is preferably fabricated from copper; however, other non-magnetic conductive materials are also suitable.

Detachably mounted within the waveguide structure, are a plurality of tapered glass containers designated generally by the numeral 12. Each of the containers is provided with a tapered inlet portion 13, and a cylindrical outlet portion 14. The cylindrical portion of each tube is integrally joined to the large end of the tapered portion along the line 16, shown best in FIGURE 1, the container, as shown, defining a figure of revolution about the longitudinal axis extending through the cylindrical and tapered portions. At its small end each of the tapered portions is provided with a cylindrical inlet extension 17 extending substantially perpendicular to the axis of the tapered section or portion 13. The inlet extension 17 extends through a dielectric grommet 18 fitted snugly in aperture 19 in bottom wall 4 of the waveguide. As shown best in FIGURE 4, the inlet end of each tapered portion is supported on the grommet, preferably formed from Teflon, and the inlet extension extends outwardly through the grommet and is thermally insulated and cushioned thereby from the waveguide wall 4. The grommet thus forms a bushing for the inlet extension 17, and secures it against relative motion due to vibration, jolts, and impact shocks. Dielectric pads 20 secured within the waveguide at the union between the cylindrical and tapered container portions support the containers intermediate their ends. Suitably secured to the inlet extension 17 on the outside of the waveguide, is a short length of rubber hose 21. The hose is secured to the extension 17 by a clamp 22 which may be suitably secured or clamped about the rubber hose and extension 17 to form a water-tight union by means of a screw (not shown). As shown best in FIGURE 4, the inner end 24 of the rubber hose resiliently abuts the bottom wall 4 of the waveguide, and upon tightening of the clamp 22 the rubber hose cooperates with the Teflon grommet 18 to closely confine the inlet extension and thus the tapered inlet portion of the glass container against relative movement. As shown best in FIGURES 1, 3, and 4, a metal strap 26 extends transversely across the bottom wall of the waveguide 4 at the point where the inlet extensions 17 of the tapered containers extend out of the waveguide. The strap is conveniently welded or brazed to the bottom wall 4 of the waveguide, and provides a means for attaching a radio frequency choke structure about the inlet end of the glass containers and the hoses 21.

The radio frequency choke structure comprises a hollow shell 27 brazed at one end in an aperture formed in the strap 26, and coaxially arranged about the inlet extension 17. At its other end the shell 27 is tapered for a portion of its length and is provided with a cylindrical portion 28 of reduced cross section, to which the inner end of a short cylindrical section of tubular conductor 29 is brazed. As shown best in FIGURE 4, the proportions of the parts are such that the inner diameter of the tubular section 29 is closely spaced to the outer periphery of the hose 21. In accordance with well known practice, the length of the radio frequency choke is selected to be one-quarter of a wavelength long at the frequency for which the waveguide is designed. The radio frequency choke structure therefore cooperates with the water passing into the container to attenuate the wave, thus in effect shorting the radio frequency energy tending to escape from the waveguide through the inlet aperture 19.

At its end remote from the waveguide, each of the hoses 21 is detachably clamped to a short manifold extension 31 by means of clamp 32 secured by screw 33. Each of the manifold extensions 31 communicates with the main inlet manifold 34 by suitable pipe T's 36 and 37. As shown best in FIGURE 3, the T 37 is of the reducing type and is connected by a short nipple 38 to an inlet T 39 having one of its branches connected to a source of cooling water. Its opposite branch is connected to a pipe 41, which adjacent its upper end is integrally brazed to the strap 26 projecting from under the wall 4 of the waveguide. A suitable T structure 42 fixed to the upper end of pipe 41 is arranged to permit the insertion of a thermometer 43 into a suitable thermometer well 44 in pipe 41 in contact with the circulating inlet water. A bracket 45 fixed to the upper end of the assembly 42 provides a convenient means of supporting the thermometer, while permitting the thermometer to be read.

To prevent the occurrence of so-called "water hammer" in the inlet system, the T 36 is connected by one of its branches to one end of an elbow 46 connected at its other end to a vertical standpipe 47. The upper end of the standpipe is provided with a detachable cap 48 which may be detached for the admission of air into the system above the water. Sudden fluctuations in water pressure will therefore be absorbed by compression of the air in the standpipe, rather than being transmitted to the fragile portions of the assembly. It will thus be seen that each of the glass containers within the waveguide is supplied with water from a common source having a uniform water pressure. It will also be apparent that the temperature of the inlet water may be conveniently measured closely adjacent its inlet into the system. Because of the cooperative arrangement of elements of the combination, variations in the temperature of the water, the waveguide, or the radio frequency choke structure, will not materially affect the sealing qualities of the relationship between hose and inlet extension 17. Nor will such fluctuations in temperature between the related parts place any undue or destructive stresses upon the inlet end of the glass container 12.

At the output end of the waterload, each of the glass containers 12 is resiliently supported against destructive contact with the waveguide walls by suitable packing material 51, conveniently an annular rubber ring fitting snugly about the cylindrical periphery of each cylindrical portion 14 adjacent its outlet end. A suitable saddle block 52, detachably connected to the interior of the waveguide adjacent its output end by means of suitable screws, closely encircles the packing material 51 and confines the outlet ends of the cylinders 14 against shock and vibration while permitting longitudinal expansion and contraction. A cylindrical outlet extension 53 integral with the end of the cylinder 14 provides an outlet for the cooling water passing through the container. As shown best in FIGURE 6, the outlet extension 53 is positioned on the cylindrical portion 14 off-center adjacent one of its outer peripheral walls and adjacent the upper wall 3 of the waveguide. From this arrangement it will be seen that water entering inlet extension 17 passes through the lower wall of the waveguide, travels uphill and is discharged adjacent the upper wall of the waveguide. This prevents the entrapment of air in the containers 12, which would adversely affect the absorption of the electromagnetic energy transmitted into the waterload.

While the inlet extension is shown and described as extending through the bottom wall of the waveguide, it will be obvious that the inlet extension could as well extend through the top or side walls of the waveguide, as could the outlet extensions 53, as long as the relationship between the inlet and outlet ends is arranged to prevent the entrapment of air within the containers. Important also is positioning of the small diameter ends of the containers adjacent opposite side walls of the waveguide. It has been found that the electric field is strongest near the axis of the waveguide, and that positioning the container ends adjacent the side walls results in a more gradual attenuation of the radio-frequency energy wave.

Detachably secured to the flange 7 at the output end of the waveguide is an output manifold and radio-frequency choke assembly. The output manifold and radio-frequency choke assembly are fabricated as an integral unit which may be detachably secured to flange 7 by suitable cap screws 54 extending through apertures 8 in flange 7. The assembly comprises a flat apertured plate 56, conveniently of copper, secured adjacent its outer periphery to flange 7. Fixed on the side of the plate 56 facing the interior of the waveguide are two plates 57. Each plate 57 is associated adjacent the outlet end of a cylinder 14 and is provided with an aperture through which the extension 53 extends. The plates 57 may be conveniently referred to as tube retainer plates and provide a convenient means against which outlet hoses 57, preferably of rubber, may resiliently abut. As shown best in FIGURES 5 and 6, one end of each of the hoses 58 is securely clamped about an outlet extension 53 by a detachable clamp 59, secured by a screw 61. It will thus be seen that the end of each cylindrical container portion 14 lies resiliently cradled within the associated packing material 51, while each extension 53 is connected to a resilient hose 58, thus preventing the transmission of shocks and vibration to the glass container 14 and precluding destructive stresses being imposed on this member.

As at the inlet end of the waterload, each of the outlet tubes or hoses 58 is surrounded by a radio-frequency choke structure comprising a shell 62 including a cylindrical portion 63. The cylindrical portion constitutes the outer end of the shell and is suitably brazed conductively to cylinder 64. Again, the proportions of the parts are selected so that the cylinder 64 closely confines the hose 58, and the length of the choke structure is chosen to be substantially equal to one-quarter of a wavelength of the frequency being absorbed for reasons previously discussed.

As shown best in FIGURES 3, 5 and 6, each of the hoses 58 is detachably connected to an outlet manifold by means of manifold extensions 66, extending into the outer end of hoses 58 and secured thereto in a watertight manner by detachable clamps 67 secured by screws 68. Each of the outlet manifold extensions 66 communicates with the main transversely extending manifold including an elbow 69 connected to one of the extensions 66 and to a nipple 71, which in turn is connected to one branch of a pipe T 72, a perpendicular branch of which is connected to the other extension 66. The remaining branch of the T 72 is connected to a nipple 73. The end of the nipple 73 remote from the T 72 is connected with a T 74 having connected at one of its branches an outlet extension 76 adapted to empty into a suitable drain (not shown) to dispose of the water passing through the waterload. Where desired or required, the outlet extension could be connected to the inlet of a recirculating system for the water. The axially aligned branch of the T 74 is provided with a thermometer well 77 extending into the outlet manifold in a manner to be effected by the heat of the outlet water. The well is provided with a bracket 78 suitably enclosing a thermometer 79. As shown best in FIGURE 3, the thermometer bracket 45 at the inlet end of the waterload and the thermometer bracket 78 at the outlet end of the waterload are cut away on one side to permit the graduations of the thermometers to show through. It will thus be seen that at any instant of time each of the thermometers may be read to determine the differences in temperature between the inlet water and the outlet water, and suitable computations can be made to determine the power output of the radio-frequency generating unit. In this manner it may be determined when the unit generating the radio-frequency energy has reached its optimum or maximum output, at which time the unit may be switched to transmit radio-frequency electromagnetic energy at full power from a suitable radiating antenna. As seen best in FIGURES 3 and 5, rigidity is provided in the construction by means of gusset plates 80 extending, respectively, between the nipples 71 and 73 at one end and the end plate 56 at the other.

From the foregoing it will be apparent that each of the containers 12 is provided at its outlet end with suitable cushioning means to prevent destructive shocks and jolts being applied, while permitting relative movement between containers and waveguide, and that the arrangement of parts permits the easy dismantling of the output manifold assembly. It will also be apparent that the temperature of the outlet water may conveniently be read by means of the thermometer 79, thus providing the information necessary for determining with great exactitude the power output of the generating unit to which the waterload is connected. Additionally, it will be noted that by means of the inlet and outlet extensions 17 and 53, respectively, the glass containers extend completely through the waveguide, commencing outside the waveguide, extending therealong, and terminating in the extension 53 outside the waveguide, each of the extensions being suitably sealed to prevent the leakage of water. Although two containers 12 have been described in a particularly advantageous arrangement, it will be understood that many features of the invention can be employed with a different number of containers.

I claim:

1. A waterload for absorbing electromagnetic energy comprising a hollow non-magnetic tubular body having an open input end adapted to be connected to a source of said electromagnetic energy and a closed terminal end, said tubular body having a side wall structure shaped to provide an open passage therein extending from said open end to said terminal end, at least one dielectric container within said tubular body defining a figure of revolution about its longitudinal axis and tapering from a minimum diameter adjacent said input end of the tubular body to a maximum diameter adjacent said terminal end of the tubular body, said dielectric container lying entirely in said passage, said minimum diameter end of the container lying closely adjacent said side wall structure and having a tubular inlet extension projecting entirely through said side wall structure at an angle to the axis of said container, said maximum diameter end of the container terminating adjacent said terminal end of the tubular body and having a tubular outlet extension projecting through said terminal end.

2. A waterload as claimed in claim 1 wherein said outlet extension is positioned adjacent the periphery of the container on the side thereof opposite the side of the tubular body through which said inlet extension projects.

3. A waterload as claimed in claim 1 further comprising a flexible hose having one end sealed water-tight to said inlet extension, a second flexible hose having one end sealed water-tight to said outlet extension, pipes rigidly connected to said tubular body, said hoses having their other ends sealed water-tight to said pipes and having a substantial free flexure length between said sealed ends, and said container being free to expand and contract relative to said tubular body, whereby such movement is accommodated by flexure of the intermediate portions of said flexible hoses.

4. A waterload as claimed in claim 3 further comprising a quarter wavelength choke around each of said hoses, said chokes each comprising a shell having a large diameter end attached to said tubular body and a small diameter end closely surrounding its respective hose.

References Cited in the file of this patent

UNITED STATES PATENTS

| | | |
|---|---|---|
| 2,560,536 | Althouse | July 17, 1951 |
| 2,669,696 | Ward | Feb. 16, 1954 |
| 2,850,702 | White | Sept. 2, 1958 |
| 2,866,950 | Smits | Dec. 30, 1958 |
| 2,877,428 | Krstansky | Mar. 10, 1959 |

OTHER REFERENCES

Freedman: "Waters Load," Radio-Electronic Engineering, May 1954, pages 14, 15 and 35.